US011956268B2

(12) United States Patent
Hammitt (10) Patent No.: US 11,956,268 B2
(45) Date of Patent: Apr. 9, 2024

(54) ARTIFICIAL INTELLIGENCE (AI) BASED PRIVACY AMPLIFICATION

(71) Applicant: Davidson Technologies, Inc., Huntsville, AL (US)

(72) Inventor: Lisa C. Hammitt, Huntsville, AL (US)

(73) Assignee: Davidson Technologies, Inc., Huntsville, AL (US)

( * ) Notice: Subject to any disclaimer, the term of this patent is extended or adjusted under 35 U.S.C. 154(b) by 229 days.

(21) Appl. No.: 17/452,195

(22) Filed: Oct. 25, 2021

(65) Prior Publication Data

US 2022/0321593 A1 Oct. 6, 2022

Related U.S. Application Data

(60) Provisional application No. 63/200,967, filed on Apr. 6, 2021.

(51) Int. Cl.
*H04L 9/40* (2022.01)
*H04L 9/00* (2022.01)

(52) U.S. Cl.
CPC .......... *H04L 63/1433* (2013.01); *H04L 9/008* (2013.01)

(58) Field of Classification Search
CPC . H04L 63/1433; H04L 9/008; H04L 63/0428; H04L 63/1408; H04L 63/205; G06N 20/00
See application file for complete search history.

(56) References Cited

U.S. PATENT DOCUMENTS

| | | | |
|---|---|---|---|
| 2017/0243028 A1* | 8/2017 | LaFever | G06F 21/6254 |
| 2020/0044852 A1* | 2/2020 | Streit | H04L 9/3231 |
| 2020/0092265 A1* | 3/2020 | Sivakumar | G06N 20/00 |
| 2020/0334306 A1 | 10/2020 | Baughman et al. | |
| 2022/0075878 A1* | 3/2022 | Begg | G06F 21/602 |
| 2022/0131690 A1* | 4/2022 | Toudeh-Fallah | H04L 9/0858 |

(Continued)

FOREIGN PATENT DOCUMENTS

WO 2022217178 10/2022

OTHER PUBLICATIONS

"International Application Serial No. PCT US2022 070953, International Search Report dated May 18, 2022", 2 pgs.

(Continued)

*Primary Examiner* — Meng Li
(74) *Attorney, Agent, or Firm* — Schwegman Lundberg & Woessner, P.A.

(57) ABSTRACT

Disclosed are systems, methods, and non-transitory computer-readable media for AI based privacy amplification. A data security system allows for data transmitted between devices to be secured using varying levels of data security that are adjusted dynamically based on the determined sensitivity level of the data. The data security system uses AI (e.g., machine learning models) to predict the sensitivity level of data being transmitted between the devices in real-time and applies an appropriate level of data security based on the predicted sensitivity level. Dynamically adjusting the level of data security that is used based on the sensitivity level of the data provides for heightened levels of data security to protect highly sensitive data, and lower levels of data security to conserve computing resources when protecting less sensitive data.

20 Claims, 6 Drawing Sheets

(56) References Cited

U.S. PATENT DOCUMENTS

2022/0245287 A1* 8/2022 Fernandez ............ H04W 12/50
2023/0254132 A1* 8/2023 Ramanathan ............. H04L 9/30
380/28

OTHER PUBLICATIONS

"International Application Serial No. PCT US2022 070953, Written Opinion dated May 18, 2022", 6 pgs.
"International Application Serial No. PCT US2022 070953, International Preliminary Report on Patentability dated Oct. 10, 2023", 8 pgs.

* cited by examiner

ARTIFICIAL INTELLIGENCE (AI) BASED PRIVACY AMPLIFICATION

CROSS-REFERENCE TO RELATED APPLICATIONS

The present application claims the benefit of priority of U.S. Provisional Application No. 63/200,967, filed on Apr. 6, 2021, which is incorporated herein by reference in its entirety

TECHNICAL FIELD

An embodiment of the present subject matter relates generally to data security and, more specifically, to artificial intelligence (AI) based privacy amplification.

BACKGROUND

Data security has become an increasingly growing concern. For example, malicious actors often attempt to intercept digital data as it is transmitted among devices. Various data security techniques are currently used to securely transmit data between devices. For example, data encryption is used to alter data into an encrypted form prior to being transmitted to a recipient device, which then decrypts the encrypted data back into its original form. Other security techniques may also be used to provide varying levels of data security. Achieving higher levels of data security generally requires an increase in both system complexity and resource usage. This can be problematic in certain applications, such as when securing voice communications in which data is continuously transmitted between devices. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for AI based privacy amplification. A data security system allows for data transmitted between devices to be secured using varying levels of data security that are adjusted dynamically based on the determined sensitivity level of the data. The data security system uses AI (e.g., machine learning models) to predict the sensitivity level of data being transmitted between the devices in real-time and applies an appropriate level of data security based on the predicted sensitivity level. For example, the data security system may apply a higher level of data security to data that is determined to be highly sensitive and a lower level of data security to data that is determined to be less sensitive. Dynamically adjusting the level of data security that is used based on the sensitivity level of the data provides for heightened levels of data security to protect highly sensitive data, and lower levels of data security to conserve computing resources when protecting less sensitive data.

Figure 1:
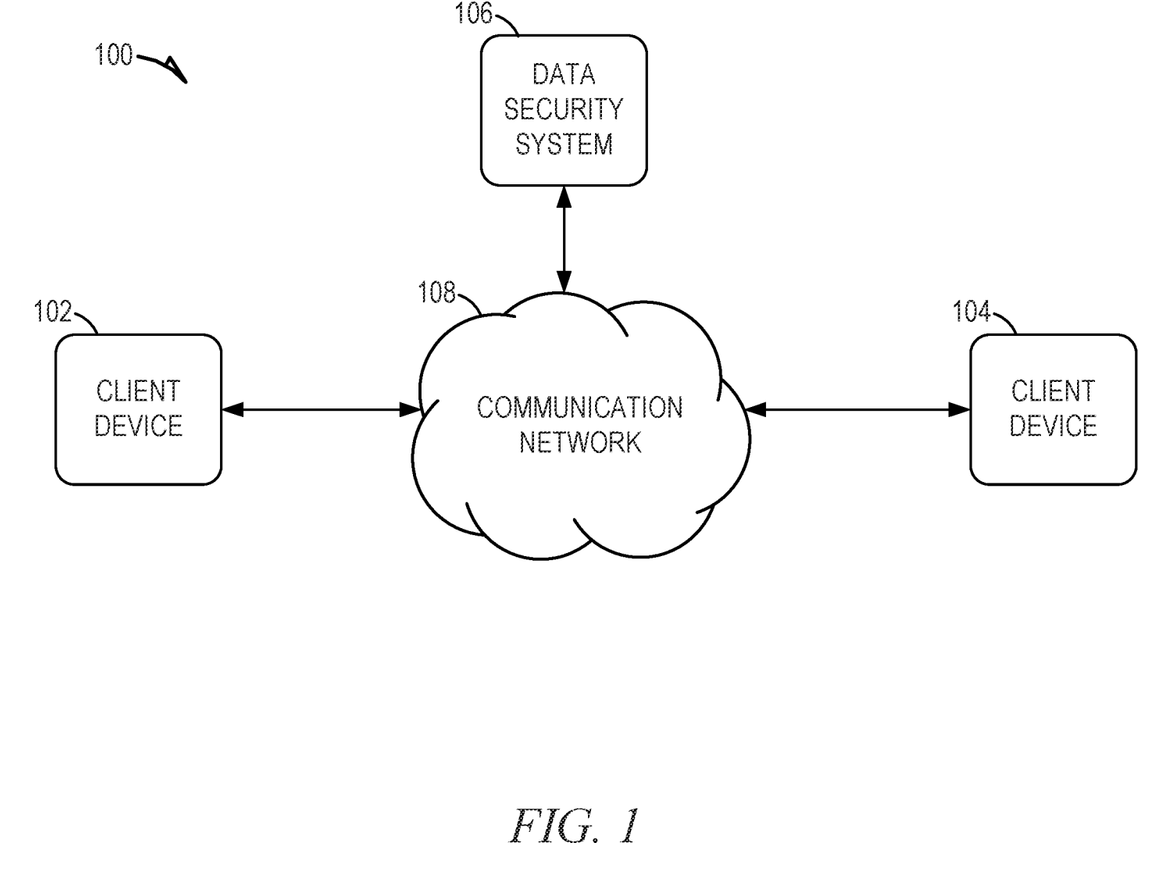
FIG. 1 shows a system for AI based privacy amplification, according to some example embodiments.

FIG. 1 shows a system 100 for AI based privacy amplification, according to some example embodiments. As shown, multiple devices (i.e., client device 102, client device 104, and data security system 106) are connected to a communication network 108 and configured to communicate with each other through use of the communication network 108. The communication network 108 is any type of network, including a local area network (LAN), such as an intranet, a wide area network (WAN), such as the internet, a telephone and mobile device network, such as cellular network, a quantum network, or any combination thereof. Further, the communication network 108 may be a public network, a private network, or a combination thereof. The communication network 108 can be implemented using any number of communication links associated with one or more service providers, including one or more wired communication links, one or more wireless communication links, or any combination thereof. The communication network 108 can also facilitate point to point telecommunication between devices. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 600 shown in FIG. 6.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users can use the client devices 102, 104 to communicate with other users. For example, a user can use one client device 102 to establish a communication session with another user's client device 104 to facilitate communication between the users. A communication session is any type of synchronous or asynchronous communication between two or more client devices 102, 104 (e.g., smart phones, laptops, computers, etc.), such as text communication, voice communication (e.g., phone call), video communication (e.g., video conference), etc.

As explained earlier, data security is an increasingly growing concern as malicious actors often attempt to intercept data as it is transmitted between client devices 102, 104. For example, malicious actors may intercept communication data (e.g., voice, text, video, etc.) transmitted as part of a communication session to access confidential and/or sensitive data. While various data security technique are available, achieving higher levels of data security generally requires an increase in both system complexity and resource usage, which can be problematic when securing communication sessions as data is continuously transmitted between client devices 102, 104.

The data security system 106 alleviates these issues by dynamically adjusting the level of data security that is applied to a communication session based on the determined sensitivity level of the communication data. For example, the data security system 106 applies a higher level of data security to communication data that is determined to be highly sensitive and a lower level of data security to data that is determined to be less sensitive. A higher level of data security may include use of more data security mechanisms and/or more complicated data security mechanisms that are used at a lower level of data security.

The data security system 106 uses AI to predict the sensitivity level of data communications in a communication session. For example, the data security system 106 may use a machine learning model to predict the sensitivity level of the data communications. The machine learning model may be trained using threat assessment training data including historical communication data that is labeled to indicate a sensitivity level of communications included in the historical communication data. The trained machine learning model outputs a sensitivity level value based on communication data provided as input. The sensitivity level value indicates an estimated sensitivity level of the input communication data. For example, a relatively high sensitivity level value may indicate that the communication data includes highly sensitive data, while a relatively lower sensitivity level value may indicate that the communication data includes less sensitive data.

The data security system 106 adjusts the data security level used to secure a communication session based on the sensitivity level value determined from the communication data. For example, the data security system 106 may configure the communication session to operate according to a variety of data security configurations that each provide a different data security level. Each data security configuration defines one or more data security mechanisms that are used to secure the communication session. Each data security configuration may be mapped to a sensitivity level value and/or range of sensitivity values. The data security system 106 identifies the data security configuration mapped to a sensitivity level and configures the communication session to operate according to the data security configuration to provide the associated data security level.

Although the data security system 106 is shown as being separate from the client device 102, 104, this is just one embodiment and is not meant to be limiting. In some embodiments, some or all of the functionality of the data security system 106 may be implemented at the client devices 102, 104. Although the shown system 100 includes only two client devices 102, 104, this is only for ease of explanation and is not meant to be limiting. One skilled in the art would appreciate that the system 100 can include any number of client devices 102, 104. Further, the data security system 106 may concurrently accept communications from and/or interact with any number of client devices 102, 104, and support connections from a variety of different types of client devices 102, 104, such as servers, desktop computers; mobile computers; mobile communications devices, e.g., mobile phones, smart phones, tablets; smart televisions; set-top boxes; and/or any other network enabled computing devices. Hence, the client devices 102, 104 may be of varying type, capabilities, operating systems, and so forth.

Figure 2:
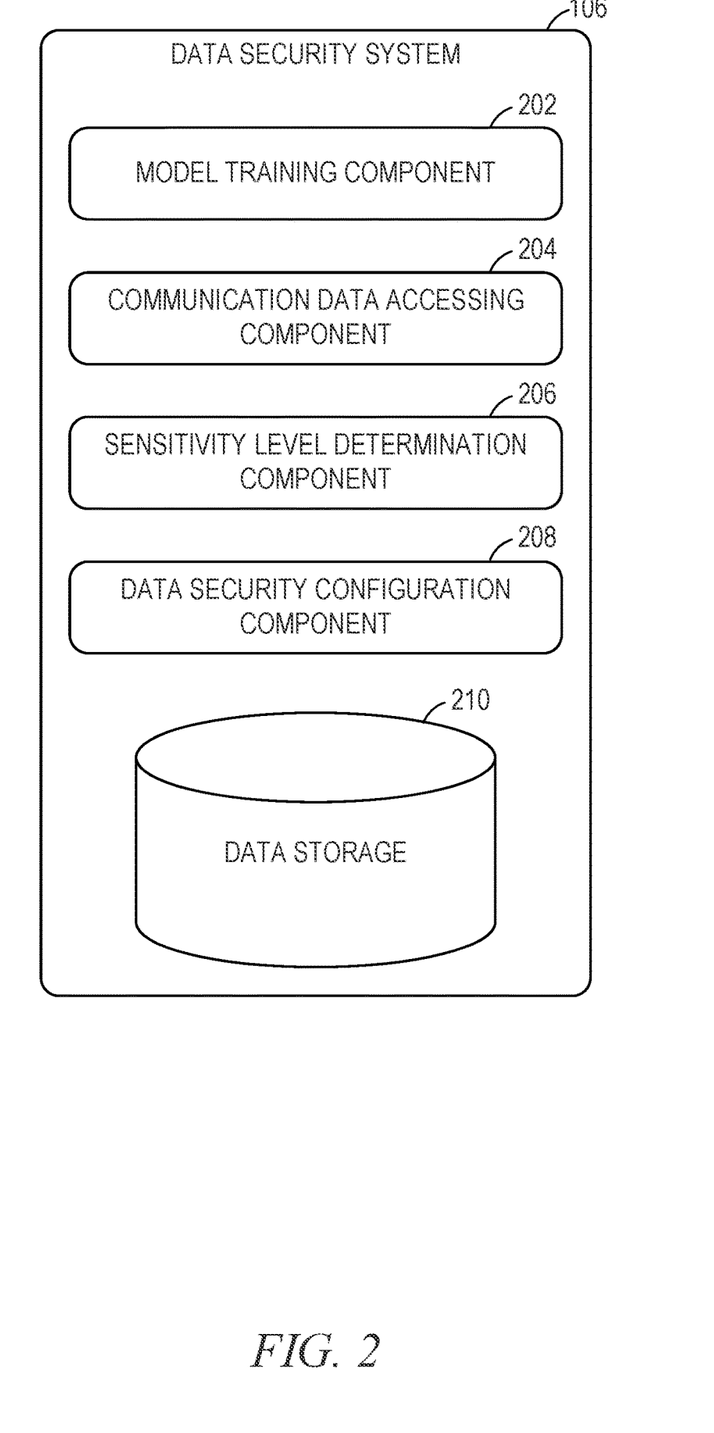
FIG. 2 is a block diagram of a data security system, according to some example embodiments.

FIG. 2 is a block diagram of a data security system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the data security system 106 to facilitate additional functionality that is not specifically described herein. Furthermore, the various functional components depicted in FIG. 2 may reside on a single computing device or may be distributed across several computing devices in various arrangements such as those used in cloud-based architectures. For example, in some embodiments the functional components depicted in FIG. 2 may reside at least partially on a client device 102, 104.

As shown, the data security system 106 includes a model training component 202, a communication data accessing component 204, a sensitivity level determination component 206, a data security configuration component 208, and a data storage 210.

The model training component 202 generates a machine learning model used to predict the sensitivity level of communication data. For example, the trained machine learning model uses communication data transmitted as part of a communication session as input and outputs a sensitivity level value based on the communication data. The sensitivity level value indicates an estimated sensitivity level of the communications represented by the communication data.

The model training component 202 trains the machine learning model based on threat assessment training data. The threat assessment training data includes historical communication data that has been labeled to indicate the sensitivity level of the communications represented by the communication data. For example, the historical communication data may be labeled by human labelers that evaluate the content of the communication data. Alternatively or additionally, the historical communication data may be labeled by users during a communication for use in generating the threat assessment training data. For example, users engaged in a communication session may manually provide input indicating the sensitivity level of the communications in real-time, such as by pressing a button on a client device 102, 104.

The threat assessment data may also include contextual data describing the conditions under which the communication data was captured. For example, the contextual data can identify the users participating in the communication session, the types of users (e.g., title, rank, etc.), location of users, time of the communication session, and the like.

The model training component 202 may train one or multiple machine learning models based on the threat assessment data. For example, the model training component 202 may train a single machine learning model based on all of the threat assessment data and/or multiple machine learning models based on subsets of the threat assessment data. This allows for targeted machine learning models to assess the sensitivity level of data communications based on the context of a communication session. For example, the model training component 202 may train a machine learning model to assess the sensitivity level of communication data for particular users participating in a communication session, types of users participating in a communication session, location of the users, types of client devices, and the like. To accomplish this, the model training component 202 uses the context data included in the threat assessment data to identify a subset of the threat assessment data that meets a specified context. The model training component 202 then trains the machine learning model based on the subset of threat assessment data.

The model training component 202 stores the trained machine learning models in the data storage 210, where they may be accessed by the other components of the data security system 106. The trained machine learning models may be stored along with metadata describing the machine learning models, such as the context data associated with the machine learning model, the date/time at which the machine learning model was generated, and the like. The model training component 202 may periodically update the trained machine learning model based on additional threat assessment data and/or feedback data provided to outputs generated by the machine learning model. The data storage 210 may be a data storage 210 of a client device 102, 104 and/or of a cloud-based computing system.

The communication data accessing component 204 accesses communication data transmitted as part of a communication session. Communication data includes any of a variety of data shared between client devices 102, 104 as part of a communication session. For example, the communication data may include audio data, voice data, and/or other data. The communication data accessing component 204 may be implemented at a client device 102, 104 engaged in a communication session and/or at an intermediary device through which communication data is routed between the client devices 102, 104 during a communication session. In some embodiments, the communication data may be encrypted, while in other embodiments, the communication data may not be encrypted. The communication data accessing component 204 may provide the communication data to the other components of the data security system 106 and/or store the communication data in the data storage 210 where it may be accessed by the other components of the data security system 106.

The sensitivity level determination component 206 determines a sensitivity level of the communication data accessed by the communication data accessing component 204. For example, the sensitivity level determination component 206 determines a sensitivity level value that indicates an estimated sensitivity level of the communication data. A higher sensitivity level may indicate that the communication data is highly sensitive (e.g., includes confidential information), whereas a lower sensitivity level value may indicate that the communication data is less sensitive (e.g., does not include confidential information).

The sensitivity level determination component 206 uses AI to determine a sensitivity level value based on communication data. For example, the sensitivity level determination component 206 may use a machine learning model trained by the model training component. In this type of embodiment, the sensitivity level determination component 206 accesses a machine learning model from the data storage 210 and uses the communication data to generate an input for the machine learning model. The input may be based on similar features of the communication data that was used to train the machine learning model. In some embodiments, the sensitivity level determination component 206 generates a feature vector based on the communication data and uses the feature vector as input into the machine learning model.

The machine learning model outputs a sensitivity level value based on the input provided by the sensitivity level determination component 206. The sensitivity level determination component 206 may provide the sensitivity level value to the other components of the data security system 106 and/or store the sensitivity level value in the data storage 210 where it may be accessed by the other components of the data security system 106.

The data security configuration component 208 modifies the data security level of the communication session based on the sensitivity level value determined by the sensitivity level determination component 206. For example, the data security configuration component 208 may configure the communication session to operate according to a variety of data security configurations that each provide a different data security level. Each data security configuration defines one or more data security mechanisms that are used to secure the communication session. For example, a data security configuration may define a type of encryption or encryption key to be used, how the communication data should be routed, whether quantum encryption should be used, and the like. The data security configurations may be stored in the data storage 210.

The data security mechanisms defined in a data security configuration provide for varying levels of data security. For example, a data security configuration providing a lower level of data security may include fewer and/or less resource intensive data security mechanisms, such as simple encryption using a public key. In contrast, a data security configuration providing a higher level of data security may include additional and/or higher resource intensive data security mechanisms, such as more complex encryption techniques, redirections, and the like.

Each data security configuration may be mapped to a sensitivity level value and/or range of sensitivity values. The data security configuration component 208 identifies the data security configuration mapped to the sensitivity level and accesses the data security configuration from the data storage 210. The data security configuration component then configures the communication session to operate according to the data security configuration thereby providing the associated data security level.

Figure 3:
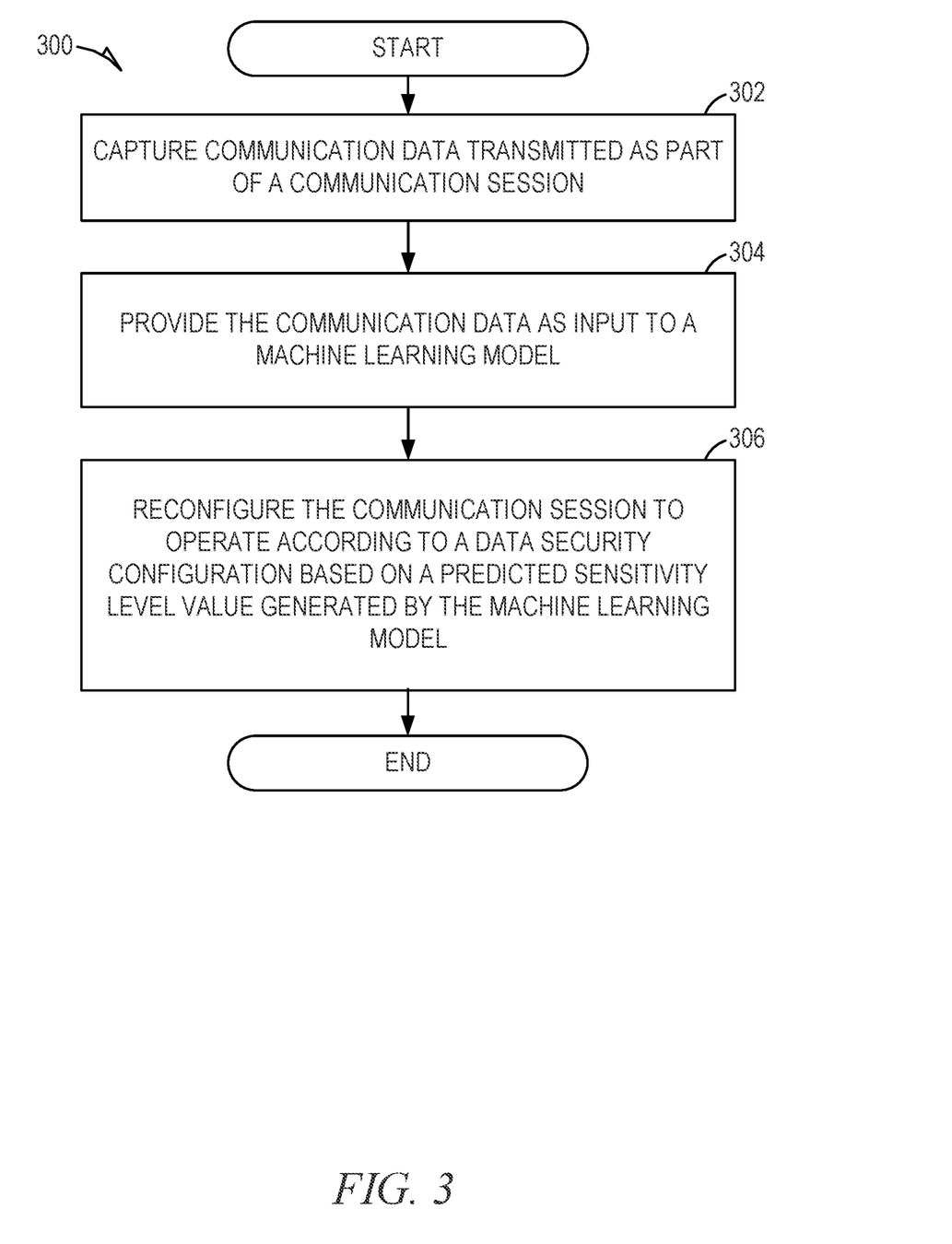
FIG. 3 is a flow diagram of a method for AI based privacy amplification, according to some example embodiments.

FIG. 3 is a flow diagram of a method 300 for AI based privacy amplification, according to some example embodiments. The method 300 may be embodied in computer readable instructions for execution by one or more computer processors such that the operations of the method 300 may be performed in part or in whole by the data security system 106; accordingly, the method 300 is described below by way of example with reference to the data security system 106. However, it shall be appreciated that at least some of the operations of the method 300 may be deployed on various other hardware and/or software configurations and the method 300 is not intended to be limited to the data security system 106.

At operation 302, the communication data accessing component 204 captures communication data transmitted as part of a communication session. The communication data accessing component 204 accesses communication data transmitted as part of a communication session. Communication data includes any of a variety of data shared between client devices 102, 104 as part of a communication session. For example, the communication data may include audio data, voice data, and/or other data. The communication data accessing component 204 may be implemented at a client device 102, 104 engaged in a communication session and/or at an intermediary device through which communication data is routed between the client devices 102, 104 during a communication session.

In some embodiments, the communication data may be encrypted. For example, the communication data may be encrypted using Homomorphic encryption. Homomorphic encryption allows for computations to be performed on the encrypted data, meaning that the encrypted data does not have to be decrypted for computations to be performed.

The communication data accessing component 204 may provide the communication data to the other components of the data security system 106 and/or store the communication data in the data storage 210 where it may be accessed by the other components of the data security system 106.

At operation 304, the sensitivity level determination component 206 provides the communication data as input to a machine learning model. The sensitivity level determination component 206 determines a sensitivity level of the communication data accessed by the communication data accessing component 204. For example, the sensitivity level determination component 206 determines a sensitivity level value that indicates an estimated sensitivity level of the communication data. A higher sensitivity level may indicate that the communication data is highly sensitive (e.g., includes confidential information), whereas a lower sensitivity level value may indicate that the communication data is less sensitive (e.g., does not include confidential information).

The sensitivity level determination component 206 uses AI to determine a sensitivity level value based on communication data. For example, the sensitivity level determination component 206 may use a machine learning model trained by the model training component. In this type of embodiment, the sensitivity level determination component 206 accesses a machine learning model from the data storage 210 and uses the communication data to generate an input for the machine learning model. The input may be based on similar features of the communication data that was used to train the machine learning model. In some embodiments, the sensitivity level determination component 206 generates a feature vector based on the communication data and uses the feature vector as input into the machine learning model.

The machine learning model outputs a sensitivity level value based on the input provided by the sensitivity level determination component 206. The sensitivity level determination component 206 may provide the sensitivity level value to the other components of the data security system 106 and/or store the sensitivity level value in the data storage 210 where it may be accessed by the other components of the data security system 106.

At operation 306, the data security configuration component 208 reconfigures the communication session to operation according to a data security configuration based on a predicted sensitivity level value generated by the machine learning model. The data security configuration component 208 modifies the data security level of the communication session based on the sensitivity level value determined by the sensitivity level determination component 206. For example, the data security configuration component 208 may configure the communication session to operate according to a variety of data security configurations that each provide a different data security level. Each data security configuration defines one or more data security mechanisms that are used to secure the communication session. For example, a data security configuration may define a type of encryption or encryption key to be used, how the communication data should be routed, whether quantum encryption should be used, and the like. The data security configurations may be stored in the data storage 210.

The data security mechanisms defined in a data security configuration provide for varying levels of data security. For example, a data security configuration providing a lower level of data security may include fewer and/or less resource intensive data security mechanisms, such as simple encryption using a public key. In contrast, a data security configuration providing a higher level of data security may include additional and/or higher resource intensive data security mechanisms, such as more complex encryption techniques, redirections, and the like.

Each data security configuration may be mapped to a sensitivity level value and/or range of sensitivity values. The data security configuration component 208 identifies the data security configuration mapped to the sensitivity level and accesses the data security configuration from the data storage 210. The data security configuration component then configures the communication session to operate according to the data security configuration thereby providing the associated data security level.

The data security system 106 may repeat the method 400 continuously and/or at specified time intervals to provide for dynamically adjusting data security levels based on the sensitivity level of the communication session. For example, the data security system 106 applies a higher level of data security to data that is determined to be highly sensitive and a lower level of data security to data that is determined to be less sensitive. The data security system 106 may utilize any number of data security configurations to apply various levels of data security. Dynamically adjusting the level of data security that is used based on the sensitivity level of the data provides for heightened levels of data security to protect highly sensitive data, and lower levels of data security to conserve computing resources when protecting less sensitive data.

Figure 4:
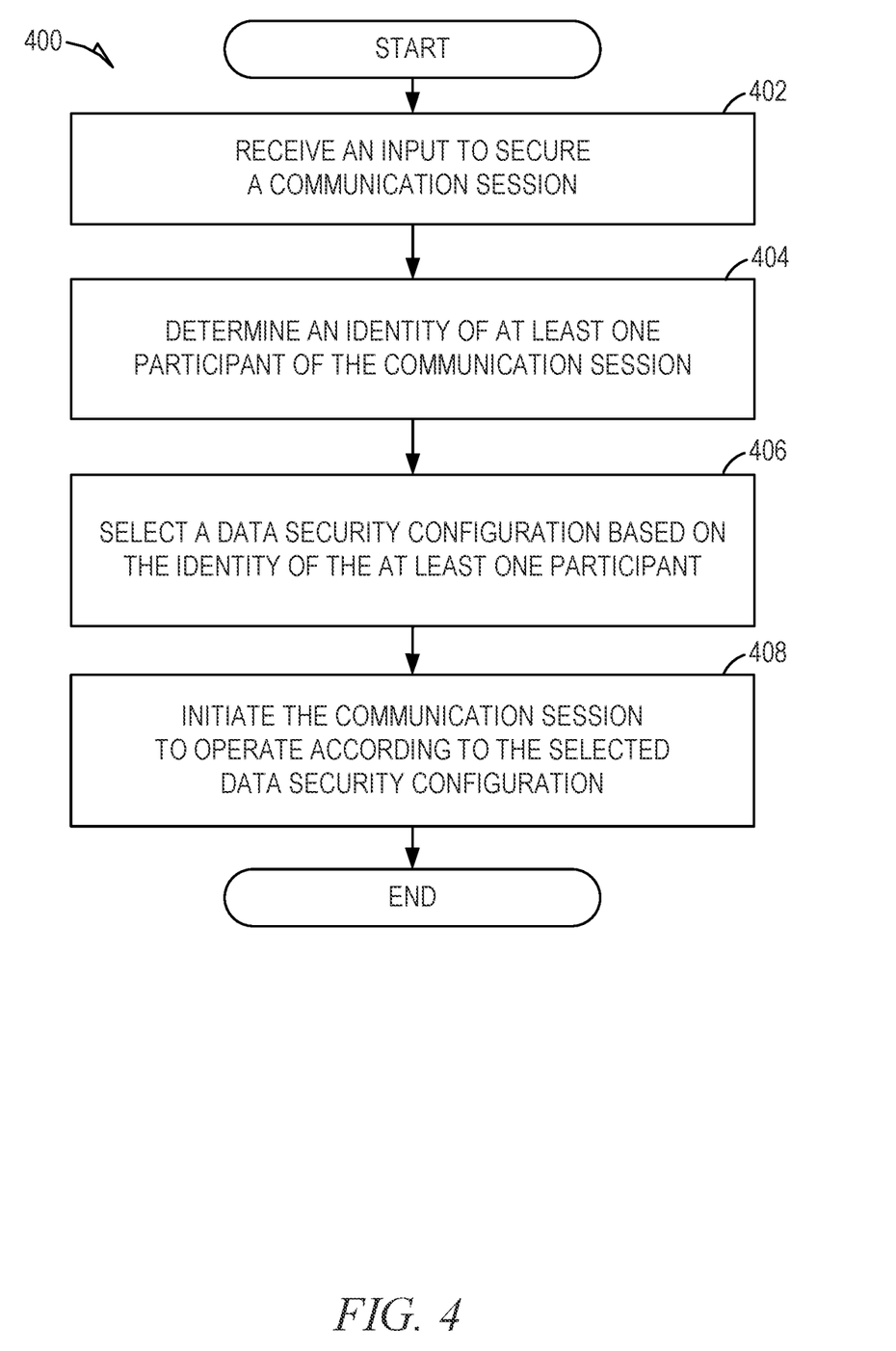
FIG. 4 is a flow diagram of a method for initiating a communication for AI based privacy amplification, according to some example embodiments.

FIG. 4 is a flow diagram of a method 400 for initiating a communication for AI based privacy amplification, according to some example embodiments. The method 400 may be embodied in computer readable instructions for execution by one or more computer processors such that the operations of the method 400 may be performed in part or in whole by the data security system 106; accordingly, the method 400 is described below by way of example with reference to the data security system 106. However, it shall be appreciated that at least some of the operations of the method 400 may be deployed on various other hardware and/or software configurations and the method 400 is not intended to be limited to the data security system 106.

At operation 402, the data security system 106 receives an input to secure a communication session. For example, the input may be automatically received as a result of a user initiating a communication session, such as by initiating a call to another user. As another example, the input may be received as a result of a user manually providing an input, such as by selecting a button or user interface element.

At operation 404, the data security system 106 determines the identity of at least one participant of the communication session. The identity of the participants may be determined based on the client devices 102, 104 being used as part of the communication session, a phone number or other identifier associated with the client devices 102, 104, and the like.

At operation 406, the data security system 106 selects a data security configuration based on the identity of the at least one participant. Data security configurations may be mapped to particular users and/or rank/title of users. The data security system 106 accesses the data security configuration that is mapped to at least on participant of the communication session. In some embodiments, the data security system 106 may select the data security configuration mapped to one of the participants that provides the highest data security level. For example, the data security system may identify the data security configurations mapped to the different participants of the communication session and then selects the data security configuration that provides the highest data security level.

At operation 408, the data security system 106 initiates the communication session to operate according to the selected data security configuration. This provides an initial level of data security to the communication session, after which the data security level may be dynamically adjusted based on the sensitivity level of the communication session.

Software Architecture

Figure 5:
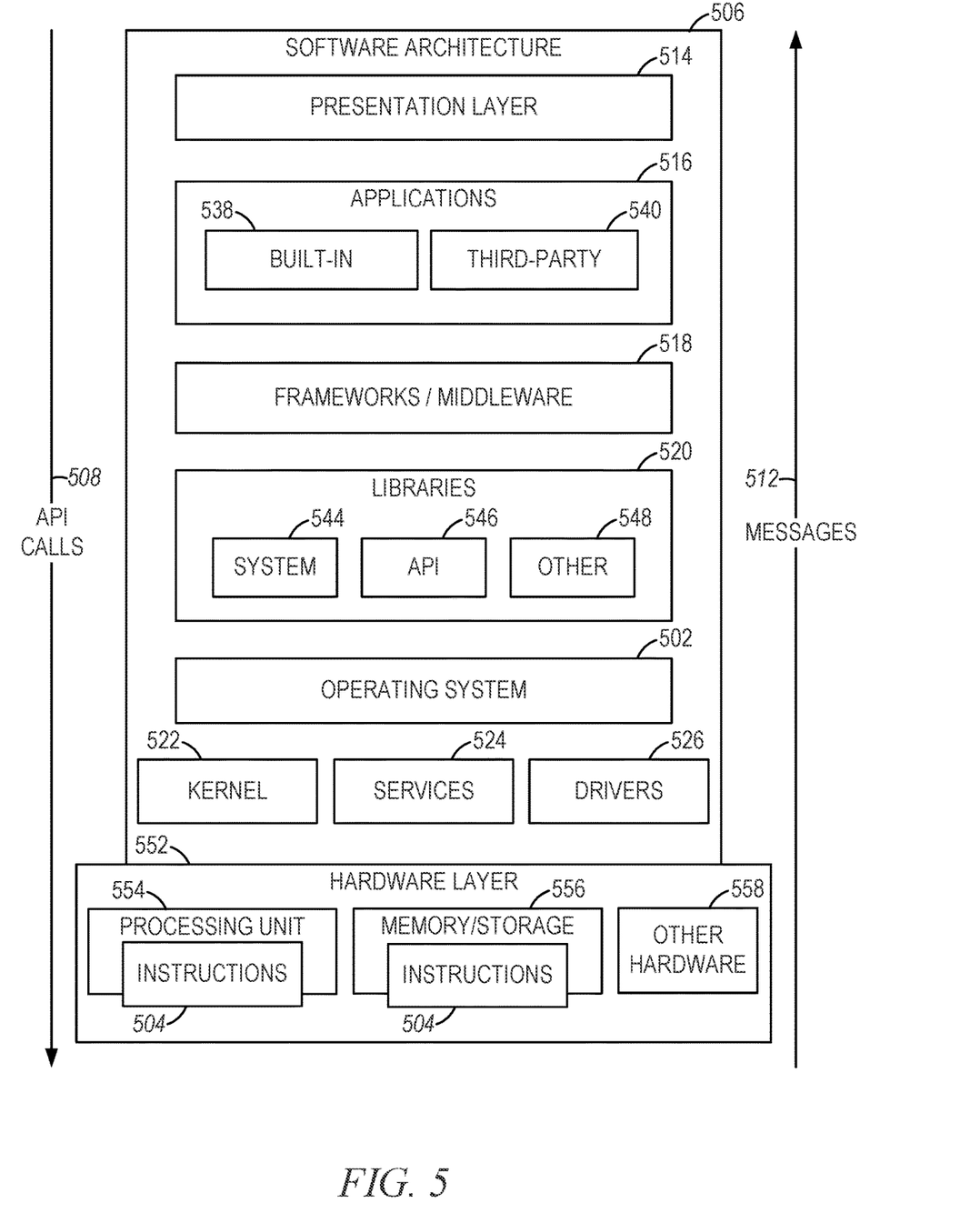
FIG. 5 is a block diagram illustrating components of a machine, according to some example embodiments, able to read instructions from a machine-readable medium (e.g., a machine-readable storage medium) and perform any one or more of the methodologies discussed herein.

FIG. 5 is a block diagram illustrating an example software architecture 506, which may be used in conjunction with various hardware architectures herein described. FIG. 5 is a non-limiting example of a software architecture 506 and it will be appreciated that many other architectures may be implemented to facilitate the functionality described herein. The software architecture 506 may execute on hardware such as machine 600 of FIG. 6 that includes, among other things, processors 604, memory 614, and (input/output) I/O components 618. A representative hardware layer 552 is illustrated and can represent, for example, the machine 600 of FIG. 6. The representative hardware layer 552 includes a processing unit 554 having associated executable instructions 504. Executable instructions 504 represent the executable instructions of the software architecture 506, including implementation of the methods, components, and so forth described herein. The hardware layer 552 also includes memory and/or storage modules 556, which also have executable instructions 504. The hardware layer 552 may also comprise other hardware 558.

In the example architecture of FIG. 5, the software architecture 506 may be conceptualized as a stack of layers where each layer provides particular functionality. For example, the software architecture 506 may include layers such as an operating system 502, libraries 520, frameworks/middleware 518, applications 516, and a presentation layer 514. Operationally, the applications 516 and/or other components within the layers may invoke application programming interface (API) calls 508 through the software stack and receive a response such as messages 512 in response to the API calls 508. The layers illustrated are representative in nature and not all software architectures have all layers. For example, some mobile or special purpose operating systems may not provide a frameworks/middleware 518, while others may provide such a layer. Other software architectures may include additional or different layers.

The operating system 502 may manage hardware resources and provide common services. The operating system 502 may include, for example, a kernel 522, services 524, and drivers 526. The kernel 522 may act as an abstraction layer between the hardware and the other software layers. For example, the kernel 522 may be responsible for memory management, processor management (e.g., scheduling), component management, networking, security settings, and so on. The services 524 may provide other common services for the other software layers. The drivers 526 are responsible for controlling or interfacing with the underlying hardware. For instance, the drivers 526 include display drivers, camera drivers, Bluetooth@ drivers, flash memory drivers, serial communication drivers (e.g., Universal Serial Bus (USB) drivers), Wi-Fi® drivers, audio drivers, power management drivers, and so forth, depending on the hardware configuration.

The libraries 520 provide a common infrastructure that is used by the applications 516 and/or other components and/or layers. The libraries 520 provide functionality that allows other software components to perform tasks in an easier fashion than to interface directly with the underlying operating system 502 functionality (e.g., kernel 522, services 524, and/or drivers 526). The libraries 520 may include system libraries 544 (e.g., C standard library) that may provide functions such as memory allocation functions, string manipulation functions, mathematical functions, and the like. In addition, the libraries 520 may include API libraries 546 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 520 may also include a wide variety of other libraries 548 to provide many other APIs to the applications 516 and other software components/modules.

The frameworks/middleware 518 (also sometimes referred to as middleware) provide a higher-level common infrastructure that may be used by the applications 516 and/or other software components/modules. For example, the frameworks/middleware 518 may provide various graphical user interface (GUI) functions, high-level resource management, high-level location services, and so forth. The frameworks/middleware 518 may provide a broad spectrum of other APIs that may be used by the applications 516 and/or other software components/modules, some of which may be specific to a particular operating system 502 or platform.

The applications 516 include built-in applications 538 and/or third-party applications 540. Examples of representative built-in applications 538 may include, but are not limited to, a contacts application, a browser application, a book reader application, a location application, a media application, a messaging application, and/or a game application. Third-party applications 540 may include an application developed using the ANDROID™ or IOS™ software development kit (SDK) by an entity other than the vendor of the particular platform, and may be mobile software running on a mobile operating system such as IOS™, ANDROID™, WINDOWS@ Phone, or other mobile operating systems. The third-party applications 540 may invoke the API calls 508 provided by the mobile operating system (such as operating system 502) to facilitate functionality described herein.

The applications 516 may use built in operating system functions (e.g., kernel 522, services 524, and/or drivers 526), libraries 520, and frameworks/middleware 518 to create UIs to interact with users of the system. Alternatively, or additionally, in some systems, interactions with a user may occur through a presentation layer, such as presentation layer 514. In these systems, the application/component "logic" can be separated from the aspects of the application/component that interact with a user.

Figure 6:
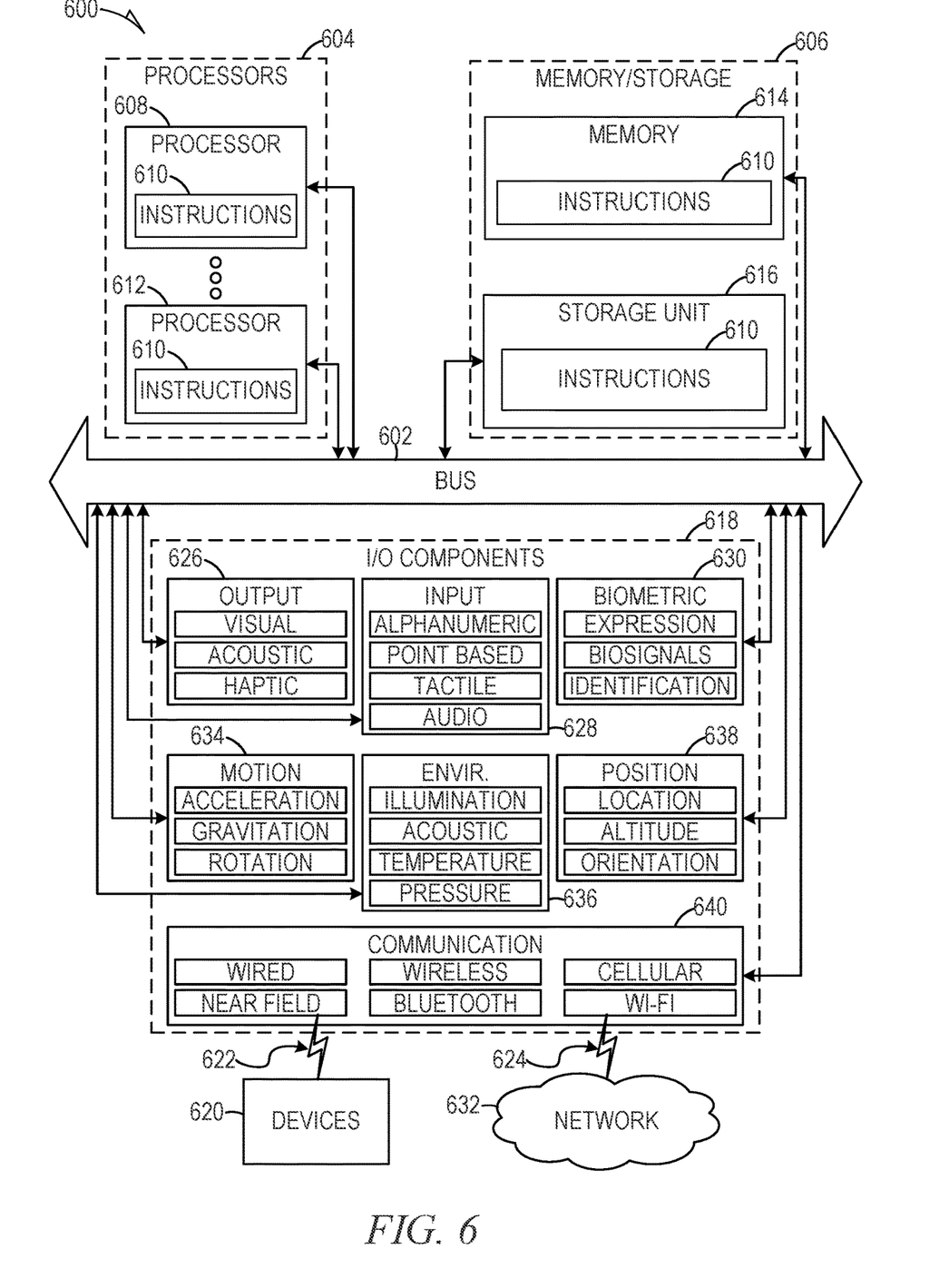
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 is a block diagram illustrating components of a machine 600, according to some example embodiments, able to read instructions 504 from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 610 (e.g., software, a program, an application, an applet, an app, or other executable code) for causing the machine 600 to perform any one or more of the methodologies discussed herein may be executed. As such, the instructions 610 may be used to implement modules or components described herein. The instructions 610 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 600 capable of executing the instructions 610, sequentially or otherwise, that specify actions to be taken by machine 600. Further, while only a single machine 600 is illustrated, the term "machine" shall also be taken to include a collection of machines that individually or jointly execute the instructions 610 to perform any one or more of the methodologies discussed herein.

The machine 600 may include processors 604, memory/storage 606, and I/O components 618, which may be configured to communicate with each other such as via a bus 602. The memory/storage 606 may include a memory 614, such as a main memory, or other memory storage, and a storage unit 616, both accessible to the processors 604 such as via the bus 602. The storage unit 616 and memory 614 store the instructions 610 embodying any one or more of the methodologies or functions described herein. The instructions 610 may also reside, completely or partially, within the memory 614, within the storage unit 616, within at least one of the processors 604 (e.g., within the processor's cache memory), or any suitable combination thereof, during execution thereof by the machine 600. Accordingly, the memory 614, the storage unit 616, and the memory of processors 604 are examples of machine-readable media.

The I/O components 618 may include a wide variety of components to receive input, provide output, produce output, transmit information, exchange information, capture measurements, and so on. The specific I/O components 618 that are included in a particular machine 600 will depend on the type of machine. For example, portable machines such as mobile phones will likely include a touch input device or other such input mechanisms, while a headless server machine will likely not include such a touch input device. It will be appreciated that the I/O components 618 may include many other components that are not shown in FIG. 6. The I/O components 618 are grouped according to functionality merely for simplifying the following discussion and the grouping is in no way limiting. In various example embodiments, the I/O components 618 may include output components 626 and input components 628. The output components 626 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 628 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 618 may include biometric components 630, motion components 634, environmental components 636, or position components 638 among a wide array of other components. For example, the biometric components 630 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 634 may include acceleration sensor components (e.g., accelerometer), gravitation sensor components, rotation sensor components (e.g., gyroscope), and so forth. The environmental components 636 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 638 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 618 may include communication components 640 operable to couple the machine 600 to a network 632 or devices 620 via coupling 624 and coupling 622, respectively. For example, the communication components 640 may include a network interface component or other suitable device to interface with the network 632. In further examples, communication components 640 may include wired communication components, wireless communication components, cellular communication components, near field communication (NFC) components, Bluetooth® components (e.g., Bluetooth® Low Energy), Wi-Fi@ components, and other communication components to provide communication via other modalities. The devices 620 may be another machine or any of a wide variety of peripheral devices (e.g., a peripheral device coupled via a USB).

Moreover, the communication components 640 may detect identifiers or include components operable to detect identifiers. For example, the communication components 640 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 640 such as location via Internet Protocol (IP) geo-location, location via Wi-Fi@ signal triangulation, location via detecting a NFC beacon signal that may indicate a particular location, and so forth.

Glossary

"CARRIER SIGNAL" in this context refers to any intangible medium that is capable of storing, encoding, or carrying instructions 610 for execution by the machine 600, and includes digital or analog communications signals or other intangible medium to facilitate communication of such instructions 610. Instructions 610 may be transmitted or received over the network 632 using a transmission medium via a network interface device and using any one of a number of well-known transfer protocols.

"CLIENT DEVICE" in this context refers to any machine 600 that interfaces to a communications network 632 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 632.

"COMMUNICATIONS NETWORK" in this context refers to one or more portions of a network 632 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 632 or a portion of a network 632 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 610 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 610. The term "machine-readable medium" shall also be taken to include any medium, or combination of multiple media, that is capable of storing instructions 610 (e.g., code) for execution by a machine 600, such that the instructions 610, when executed by one or more computer processors 604 of the machine 600, cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 604) may be configured by software (e.g., an application 516 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 604 or other programmable processor 604. Once configured by such software, hardware components become specific machines 600 (or specific components of a machine 600) uniquely tailored to perform the configured functions and are no longer general-purpose processors 604. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 604 configured by software to become a special-purpose processor, the general-purpose processor 604 may be configured as respectively different special-purpose processors (e.g., comprising different hardware components) at different times. Software accordingly configures a particular processor or processors 604, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 602) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more computer processors 604 that are temporarily configured (e.g., by software) or permanently configured to perform the relevant operations. Whether temporarily or permanently configured, such processors 604 may constitute processor-implemented components that operate to perform one or more operations or functions described herein. As used herein, "processor-implemented component" refers to a hardware component implemented using one or more computer processors 604. Similarly, the methods described herein may be at least partially processor-implemented, with a particular processor or processors 604 being an example of hardware. For example, at least some of the operations of a method may be performed by one or more computer processors 604 or processor-implemented components. Moreover, the one or more computer processors 604 may also operate to support performance of the relevant operations in a "cloud computing" environment or as a "software as a service" (SaaS). For example, at least some of the operations may be performed by a group of computers (as examples of machines 600 including processors 604), with these operations being accessible via a network 632 (e.g., the Internet) and via one or more appropriate interfaces (e.g., an API). The performance of certain of the operations may be distributed among the processors 604, not only residing within a single machine 600, but deployed across a number of machines 600. In some example embodiments, the processors 604 or processor-implemented components may be located in a single geographic location (e.g., within a home environment, an office environment, or a server farm). In other example embodiments, the processors 604 or processor-implemented components may be distributed across a number of geographic locations.

"PROCESSOR" in this context refers to any circuit or virtual circuit (a physical circuit emulated by logic executing on an actual processor 604) that manipulates data values according to control signals (e.g., "commands," "op codes," "machine code," etc.) and which produces corresponding output signals that are applied to operate a machine 600. A processor 604 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 604 may further be a multi-core processor having two or more independent processors 604 (sometimes referred to as "cores") that may execute instructions 610 contemporaneously.

What is claimed is:

1. A method comprising:
   determining an identity of a participant of a communication session;
   selecting a first data security configuration based on the identity of the participant;
   initiating the communication session to operate according to the first data security configuration; and
   while the communication session is operating according to the first data security configuration:
      capturing communication data transmitted as part of the communication session;
      generating a feature vector based on the captured communication data;
      providing the feature vector as input to a machine learning model trained based on threat assessment training data, the threat assessment training data including historical communication data that is labeled to indicate a sensitivity level of communications included in the historical communication data, the threat assessment training data including contextual data describing one or more conditions under which the historical communication data was captured, the machine learning model outputting a predicted sensitivity level value based on the feature vector; and
reconfiguring the communication session to operate according to a second data security configuration based on the predicted sensitivity level value, the second data security configuration being different than the first data security configuration.

2. The method of claim 1, further comprising:
after reconfiguring the communication session to operate according to the second data security configuration, capturing subsequent communication data transmitted as part of the communication session; and
while the communication session is operating according to the second data security configuration:
generating a subsequent feature vector based on the captured subsequent communication data;
providing the subsequent feature vector as subsequent input to the machine learning model, the machine learning model outputting a subsequent predicted sensitivity level value based on the subsequent feature vector; and
reconfiguring the communication session to operate according to a third data security configuration based on the subsequent predicted sensitivity level value, the third data security configuration being different than the first data security configuration and the second data security configuration.

3. The method of claim 1, further comprising:
after reconfiguring the communication session to operate according to the second data security configuration, capturing subsequent communication data transmitted as part of the communication session; and
while the communication session is operating according to the second data security configuration:
generating a subsequent feature vector based on the captured subsequent communication data;
providing the subsequent feature vector as subsequent input to the machine learning model, the machine learning model outputting a subsequent predicted sensitivity level value based on the feature vector; and
reconfiguring the communication session to operate according to the first data security configuration based on the subsequent predicted sensitivity level value.

4. The method of claim 1, wherein the communication data transmitted as part of a communication session is encrypted using Homomorphic encryption and the input provided to the machine learning model is encrypted.

5. The method of claim 1, wherein the communication session is a point to point communication session between a first client device and a second client device.

6. The method of claim 1, wherein the historical communication data is labeled based on one or more users engaged in a previous communication session manually indicating a sensitivity level of the previous communication session in real-time.

7. The method of claim 1, wherein the communication session is facilitated using a quantum network.

8. A system comprising:
one or more computer processors; and
one or more computer-readable mediums storing instructions that, when executed by the one or more computer processors, cause the system to perform operations comprising:
determining an identity of a participant of a communication session;
selecting a first data security configuration based on the identity of the participant;
initiating the communication session to operate according to the first data security configuration; and
while the communication session is operating according to the first data security configuration:
capturing communication data transmitted as part of the communication session;
generating a feature vector based on the captured communication data;
providing the feature vector as input to a machine learning model trained based on threat assessment training data, the threat assessment training data including historical communication data that is labeled to indicate a sensitivity level of communications included in the historical communication data, the threat assessment training data including contextual data describing one or more conditions under which the historical communication data was captured, the machine learning model outputting a predicted sensitivity level value based on the feature vector; and
reconfiguring the communication session to operate according to a second data security configuration based on the predicted sensitivity level value, the second data security configuration being different than the first data security configuration.

9. The system of claim 8, wherein the operations further comprise:
after reconfiguring the communication session to operate according to the second data security configuration, capturing subsequent communication data transmitted as part of the communication session; and
while the communication session is operating according to the second data security configuration:
generating a subsequent feature vector based on the captured subsequent communication data;
providing the subsequent feature vector as subsequent input to the machine learning model, the machine learning model outputting a subsequent predicted sensitivity level value based on the subsequent feature vector; and
reconfiguring the communication session to operate according to a third data security configuration based on the subsequent predicted sensitivity level value, the third data security configuration being different than the first data security configuration and the second data security configuration.

10. The system of claim 8, wherein the operations further comprise:
after reconfiguring the communication session to operate according to the second data security configuration, capturing subsequent communication data transmitted as part of the communication session; and
while the communication session is operating according to the second data security configuration:
generating a subsequent feature vector based on the captured subsequent communication data;
providing the subsequent feature vector as subsequent input to the machine learning model, the machine learning model outputting a subsequent predicted sensitivity level value based on the feature vector; and reconfiguring the communication session to operate according to the first data security configuration based on the subsequent predicted sensitivity level value.

11. The system of claim 8, wherein the communication data transmitted as part of a communication session is encrypted using Homomorphic encryption and the input provided to the machine learning model is encrypted.

12. The system of claim 8 wherein the communication session is a point to point communication session between a first client device and a second client device.

13. The system of claim 8, wherein the historical communication data is labeled based on one or more users engaged in a previous communication session manually indicating a sensitivity level of the previous communication session in real-time.

14. The system of claim 8, wherein the communication session is facilitated using a quantum network.

15. A non-transitory computer-readable medium storing instructions that, when executed by one or more computer processors of one or more computing devices, cause the one or more computing devices to perform operations comprising:

determining an identity of a participant of a communication session;
selecting a first data security configuration based on the identity of the participant;
initiating the communication session to operate according to the first data security configuration; and
while the communication session is operating according to the first data security configuration:
  capturing communication data transmitted as part of the communication session;
  generating a feature vector based on the captured communication data;
  providing the feature vector as input to a machine learning model trained based on threat assessment training data, the threat assessment training data including historical communication data that is labeled to indicate a sensitivity level of communications included in the historical communication data, the threat assessment training data including contextual data describing one or more conditions under which the historical communication data was captured, the machine learning model outputting a predicted sensitivity level value based on the feature vector; and
  reconfiguring the communication session to operate according to a second data security configuration based on the predicted sensitivity level value, the second data security configuration being different than the first data security configuration.

16. The non-transitory computer-readable medium of claim 15, wherein the operations further comprise:

after reconfiguring the communication session to operate according to the second data security configuration, capturing subsequent communication data transmitted as part of the communication session; and
while the communication session is operating according to the second data security configuration:
  generating a subsequent feature vector based on the captured subsequent communication data;
  providing the subsequent feature vector as subsequent input to the machine learning model, the machine learning model outputting a subsequent predicted sensitivity level value based on the subsequent feature vector; and
  reconfiguring the communication session to operate according to a third data security configuration based on the subsequent predicted sensitivity level value, the third data security configuration being different than the first data security configuration and the second data security configuration.

17. The non-transitory computer-readable medium of claim 15, wherein the operations further comprise:

after reconfiguring the communication session to operate according to the second data security configuration, capturing subsequent transmitted as part of the communication session; and
while the communication session is operating according to the second data security configuration:
  generating a subsequent feature vector based on the captured subsequent communication data;
  providing the subsequent feature vector as subsequent input to the machine learning model, the machine learning model outputting a subsequent predicted sensitivity level value based on the feature vector; and
  reconfiguring the communication session to operate according to the first data security configuration based on the subsequent predicted sensitivity level value.

18. The non-transitory computer-readable medium of claim 15, wherein the transmitted as part of a communication session is encrypted using Homomorphic encryption and the input provided to the machine learning model is encrypted.

19. The non-transitory computer-readable medium of claim 15, wherein the communication session is a point to point communication session between a first client device and a second client device.

20. The non-transitory computer-readable medium of claim 15, wherein the communication session is facilitated using a quantum network.

* * * * *